United States Patent [19]

Mims et al.

[11] Patent Number: 5,086,844
[45] Date of Patent: Feb. 11, 1992

[54] HYDRAULIC RELEASE OIL TOOL

[75] Inventors: Michael G. Mims, Bakersfield; Mark D. Mueller, Santa Maria, both of Calif.; Jeffrey C. Ehlinger, Houston, Tex.

[73] Assignee: Union Oil Company of California, Los Angeles, Calif.

[21] Appl. No.: 418,510

[22] Filed: Oct. 10, 1989

[51] Int. Cl.⁵ .............................................. E21B 23/04
[52] U.S. Cl. ..................................... 166/383; 166/154; 166/212
[58] Field of Search ............... 166/212, 214, 242, 153, 166/154, 155, 156, 168, 285, 374, 381, 383, 117, 123, 125; 175/61, 62; 285/83, 102, 306

[56] References Cited

U.S. PATENT DOCUMENTS

| | | | |
|---|---|---|---|
| 2,937,854 | 5/1960 | Kinley et al. | 255/28 |
| 3,037,797 | 6/1962 | Brown | 285/82 |
| 3,088,521 | 5/1963 | Graves | 166/214 |
| 3,842,914 | 10/1974 | Mott | 166/315 |
| 4,239,083 | 12/1980 | Silbermann et al. | 166/117.7 |
| 4,497,371 | 2/1985 | Lindsey, Jr. | 166/377 |
| 4,522,259 | 6/1985 | Akkerman | 166/237 |
| 4,526,233 | 7/1985 | Stout | 166/383 |
| 4,545,434 | 10/1985 | Higgins | 166/217 |
| 4,796,698 | 1/1989 | Gano | 166/135 |
| 4,811,784 | 3/1989 | Theiss | 166/208 |

FOREIGN PATENT DOCUMENTS 0908564 8/1972 Canada .................. 166/156

*Primary Examiner*—Terry Lee Melius
*Attorney, Agent, or Firm*—Gregory F. Wirzbicki; William O. Jacobson

[57] ABSTRACT

A hydraulic setting and release tool has a shear out setting assembly attached to a string coupling member. Upon reaching a predetermined hydraulic pressure, a piston of the tool shears restraining shear pins and moves in a body of the tool to release dogs that engage the coupling member. When the dogs release, springs retract the dogs from engagement in sockets of the coupling member and the shear out setting assembly separates from the coupling member. When used in running in a liner, the coupling member is a running head that rotates the liner during running in and cementing. When used as a drill string release tool, the coupling member is a release sub, the tool being placed serially with other string components. If the drill string gets stuck, it is separated by merely increasing the hydraulic pressure sufficiently to shear the pins and allow the piston to move and the dogs to retract to separate the release sub from the shear out assembly.

69 Claims, 3 Drawing Sheets

1

HYDRAULIC RELEASE OIL TOOL

BACKGROUND OF THE INVENTION

The present invention relates to tools used in the drilling and completion of oil wells. In particular, the invention relates to a tool that can be used to reduce friction between a liner and a well bore or to release a drill string for its removal from a well bore.

In the drilling of oil wells, a drill string is used to drill a well hole. After the well hole is drilled, casing or liner is run across the productive interval by drill pipe. With the liner in place, cement is pumped down through the drill pipe, through the liner and into an annulus between the liner and a casing in the well hole wall to cement the liner in place and to keep production fluids in the liner.

Quite often, well holes are not completely vertical. They can have substantial horizontal components. Wells with substantial horizontal components are called high angle, extended reach wells. Running the liner through high angle, extended reach well holes can be difficult because of friction between the liner and the well hole wall caused by the weight of the liner against the wall. Translational friction can be substantially reduced by rotating the liner while it is being run into the well hole.

The tools that run liners into well holes have not been able to rotate the liners while they were being run in, although the tools permit liner rotations during cementing. A reason for this is that rotation is used to release the tools from the liners once the liners are in place. Consequently, it has not been possible to rotate the liners to reduce frictional drag.

Sometimes during the drilling of a well a drill string has to be pulled from the well hole because something in the leading end of the string gets stuck. To pull the string requires disconnecting it from the stuck portion. Typically, the disconnection is done by applying left hand torque to the drill string in order to unscrew a connection at some arbitrary point within the drill pipe.

SUMMARY OF INVENTION

The present invention provides a tool and a method for its use that runs a liner in a well hole while rotating it and permits the release of the tool from the liner and the pulling of the tool and drill pipe from the hole after the liner is in place by simple hydraulic pressure. The tool and method also permit rotation of the liner during cementing. The present invention also provides a tool that can be used in a drill string to uncouple the string from its leading end at a selected location quite simply through hydraulic pressure when the leading end gets stuck to permit fishing and removal of the stuck end.

In one form, the present invention provides a hydraulic release tool that has a setting assembly and a coupling member. The setting assembly includes a body that contains a piston. The piston in a setting position attaches to the body, preferably through shear pins, so that it does not move with respect to the body until it sees a work string pressure that produces a force above a value sufficient to release the piston; when shear pins are used, to shear the pins. When this pressure is reached, the piston moves in the body to a release position. Dogs mount in the body for radial movement between retracted and extended positions. Biasing means, such as springs, bias the dogs towards their retracted position. Means on the piston keep the dogs in their extended position when the piston is in its setting position. A radially outward extending land on the piston conveniently provides these means. The dogs in their extended position engage the coupling member through sockets so that the coupling member is rotationally and translationally attached to the setting assembly. Means on the piston, such as a relief above the land, permit the dogs to retract when the piston moves to its release position. When the dogs retract, the coupling member and the setting assembly are no longer attached and can be separated. Preferably, the piston masks a relief port between work string pressure and ambient well pressure. When the piston moves to its release position, the port communicates the work string pressure to ambient pressure, lowering the work string pressure. This signals the disengagement between the setting assembly and the coupling member.

In a more detailed form, the present invention provides a hydraulic release tool that has a shear out setting assembly and a running head as the setting assembly and the coupling member. The shear out assembly includes a body that receives a piston. The piston couples to the body through shear pins. The top (in the sense of drill string location) of the piston has a face that sees hydraulic pressure within the drill pipe. The bottom of the piston also has such a face, but it is smaller in area than the top face. Accordingly, hydraulic pressure tends to move the piston towards the bottom of the string, but the piston is prevented from moving because of the shear pins. Dogs mount to the body and extend radially outward from it into engagement with sockets in the running head. This engagement rotationally and translationally couples the shear out assembly and the running head together. Springs act on the dogs to bias them inward towards the axis of the body and the shear out assembly. A land of the piston engages the base ends of the dogs to keep them extended and in engagement in the sockets.

The hydraulic release tool then directly couples to a liner and rotates the liner so that it can overcome frictional resistance between it and the well hole wall in high angle and extended reach holes. The hydraulic release tool also rotates the liner during cementing.

When it is time to pull the drill pipe, hydraulic pressure in the pipe is increased sufficiently to shear the shear pins. This happens after a liner wiper plug has been forced through the liner to wipe cement off the walls of the liner. This wiper plug lands on a landing collar and pressure increases sufficiently to shear the pins. When the pins shear, the piston moves within the body to clear the land from the base of the dogs. When the dogs become free of the land, the springs withdraw the dogs from the sockets, releasing the shear out assembly from the running head. A chamfer on the heads of the dogs insures their release from the sockets; axial force applied to the dogs by the running head through the chamfers produces radial retracting forces on the dogs.

Sometimes, the pressure in the work string cannot be increased enough to shift the piston and release the dogs. For example, if the wiper dart does not land on the landing collar, work string pressure cannot be raised sufficiently. When this happens, a pump down dart with a plug is pumped down the work string and lands on the piston of the hydraulic release tool, sealing the work string at that point. With a seal at the piston, a lower pressure shears the pins than the pressure otherwise required because no area of the piston is exposed for the pressure to act the other way to oppose shearing force. Further, the bore through the piston has been closed by the seal, and work string pressure on the sealing area now increases the force on the piston that tends to shear the pins.

The hydraulic release tool can also be a drill string release tool. The release tool is modified from the liner release tool only to adapt it for placement in the drill string through a drill string release sub.

In use, the drill string release adaptation works just like its liner release counterpart. Hydraulic pressure is increased sufficiently to shear the pins that constrained the piston, and the piston moves to clear a land from the base of dogs that engage sockets in a release sub. The release sub corresponds to the running head. Springs act on the dogs to retract them from the sockets, and the drill string is separated from its stuck portion. The separated portion of the drill string can then be pulled from the hole and the troublesome leading end of the string removed from the hole through standard techniques, as through jars and fishing.

These and other features, aspects and advantages of the present invention will become more apparent from the following description, appended claims and drawings.

DESCRIPTION OF THE PREFERRED EMBODIMENT

Figure 1:
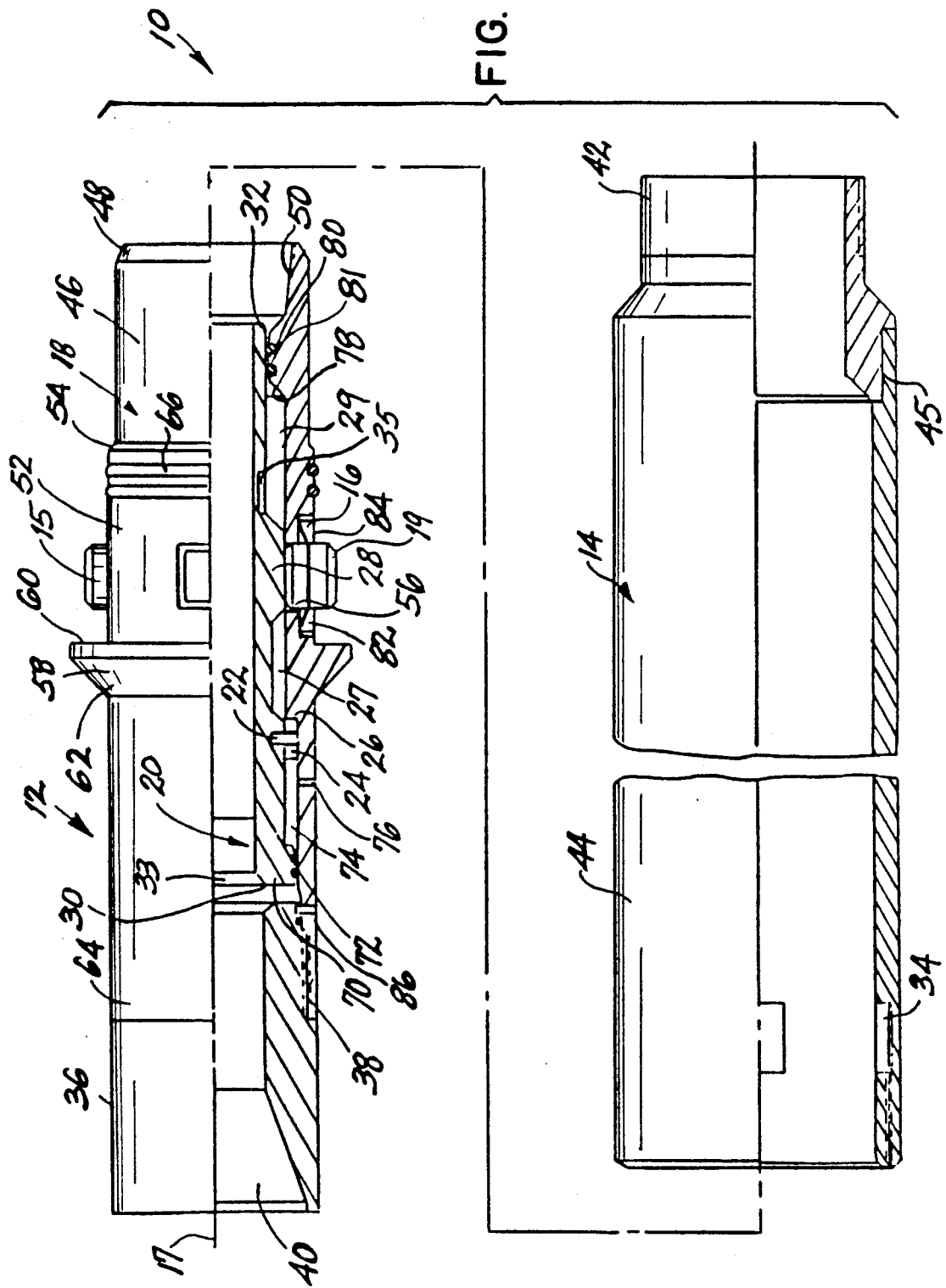
FIG. 1 shows the hydraulic release tool of the present invention, especially suitable for liner run-in, cementing, partly in half-section.

With reference to FIG. 1, a hydraulic release tool 10 of the invention used to run in and cement liners in use attaches serially in a work string between a drill pipe and the liner. The tool has a shear out setting assembly 12 and a coupling member in the form of a running head tie back receptacle 14. The shear out setting assembly and the running head have clear through axial bores for working fluids used in lining and completing a well.

The shear out setting assembly has four radially extended dogs 15 that attach the shear out assembly to the running head when extended and release the two when retracted. A spring 16 for each of these dogs biases its dog inward toward a longitudinal axis 17 of the assembly, out of the extended position shown in FIG. 1, for the release of the running head. Each dog has a lead chamfer 19.

Shear out setting assembly 12 includes a body 18 and a piston 20 within the body. The piston can translate along axis 17 in the body in response to a sufficient differential hydraulic pressure acting on its ends from a setting position to a release position. The position of FIG. 1 is the setting position. The piston is retained in the setting position of FIG. 1 by a plurality of shear pins 22. These shear pins are retained in a ring 24 and extend into the piston. Ring 24 abuts an interior shoulder 26 of body 18. An annular, external land 28 normally engages the interior ends of dogs 15 to extend the dogs against the retracting force of springs 16. Annular reliefs 27 and 29 on the upper and downward sides of the land reduce the diameter of the piston at the reliefs. (In this specification, words of direction are with reference to the work string and well hole.)

Piston 20 has an upper face 30 normal to axis 17 of the assembly in communication with and acted upon by hydraulic pressure in the work string that applies a downward force on the piston to the right in FIG. 1.

The piston also has a bottom face 32 which sees hydraulic pressure in the work string that applies an upward force on the piston that tends to force the piston to the left in FIG. 1. The area of face 30 is larger than the area of face 32 so that the net force on the piston from the hydraulic pressure in the string is downhole. When the net downhole pressure corresponds to a downhole force sufficient to shear the shear pins, the pins shear. (This pressure correlates with the force required to shear and is sometimes referred to in the specification as the "predetermined pressure.")

Figure 4:
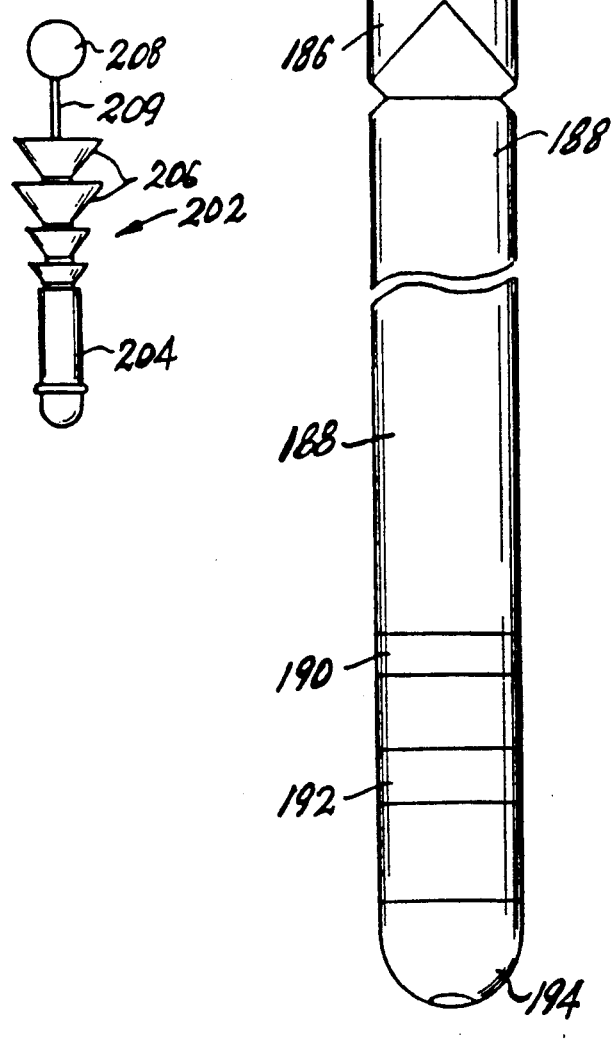
FIG. 4 shows a pump down dart that may be used with the present invention to increase the pressure on the piston to move it and release the release tool in the event that conventional techniques do not work.

A conical seat 33 at the upper end of the axial bore through the piston provides a seal for the pump down dart of FIG. 4, if one is necessary. A plurality of longitudinal bleeder slots 35 in the wall of the piston that defines the inside of relief 29 communicates liner pressure with the pressure in the annulus between the liner and the casing under circumstances of hydraulic lock. When the piston shifts to its release position, the bleeder slots can communicate the liner and the annulus through the windows that receive the dogs.

Running head 14 has four sockets 34. These sockets receive extended dogs 15 to attach the shear out setting assembly to the running head. Chamfer 19 of the dogs permits axial engagement of the dogs by the running head to force the dogs to retract if the spring force is not enough.

A top sub 36 of shear out setting assembly 12 connects to body 18 through threads 38 between the two. Sub 36 has an internal thread 40 for connection to drill pipe.

Running head 14 has a standard bottom sub 42 and a release sub 44. The release sub has sockets 34. Release sub 44 may couple to bottom sub 42 through a standard threaded connection 45. The bottom sub connects, typically, with a liner assembly.

Before proceeding with the detailed description, the operation of the hydraulic release tool as adapted for use with liners will be briefly described.

With shear out setting assembly 12 and running head 14 attached together by dogs 15 engaged in sockets 34, the tool is turned by drill pipe, and running head 14 turns a liner assembly. The liner assembly is run into a well hole while being turned. Accordingly, the friction between the wall of the well hole and the liner will be lower than it would be if the liner were not rotating. Because of the rotation, the problem that friction creates in high angle, extended reach well holes is eliminated, or at least substantially reduced.

When the liner has been run into the well hole and well cementing completed, hydraulic pressure within the work string is increased sufficiently to fail shear pins 22, and the piston moves downward. When the piston moves downward, it presents relief 27 to the base of dogs 15. The dogs, not being restrained by land 28, respond to the radially inward force of springs 16 and move out of sockets 34 and out of engagement with the running head. If one or more of the dogs stick, dog chamfer 19 engages the edge of sockets 34, and the dogs are forced to retract because of the resulting radial inward force. The shear out assembly is then free of the running head. The shear out setting assembly together with the drill pipe can then be pulled out of the hole.

Completing the detailed description of the invention shown in FIG. 1, body 18 has a lead downhole end 46. The lead end has an external chamfer 48 at its head. A female pipe thread 50 opens out the lead end and provides coupling of the shear out setting assembly with another work string component. The body steps up from leading end 46 to section 52 at a shoulder 54. This section contains windows 56 that pass dogs 15 through the body. An external flange 58 extends radially outward from the interior end of intermediate section 52. This shoulder has a right angle leading face 60 and a conical trailing face 62; the latter keeps debris and other foreign matter from between the hydraulic release tool and the interior of the running head. The trailing face of the shoulder transcends into a trailing end 64 of the body. A pair of O-rings 66 seal the interface between the body and release sub 44 of running head 14. Face 60 abuts the upper end of release sub 44 when the shear out assembly and running head are connected.

Piston 20 has an external flange 70 at its upper end. This flange mounts O-rings 72 that seal the piston and body bore wall so that hydraulic pressure does not pass the flange into an annular relief 74 behind the flange. This relief contains ring 24 and shear pins 22. One or more relief ports 76 maintain the pressure within the annular relief as that of the downhole pressure externally of the tool. When flange 70 passes the relief port, the work string pressure drops because fluid passes through the port to the outside of the tool. This drop in pressure signals the operator that the shear out assembly and running head are no longer attached together and reestablishes circulation between the work string and the annulus between it and the outer casing. (Circulation stopped with the landing of a liner wiper in a landing collar.)

A shoulder 78 on an internal flange 80 at the bottom end of relief 29 provides a stop for the piston by engaging a facing end of land 28. O-rings 81 on the interior axial surface of flange 80 seal against a surface of the piston to keep work string fluid out of relief 29. A spring keeper 82 in recess 84 for each spring 16 retains its spring in place. Each keeper is in interference with the wall of its recess.

A plurality of set screws 86 complete the connection between top sub 36 and body 18. The set screws prevent unthreading of threaded connection 38. The threads of the threaded connection, however, take the axial load.

Figure 2:
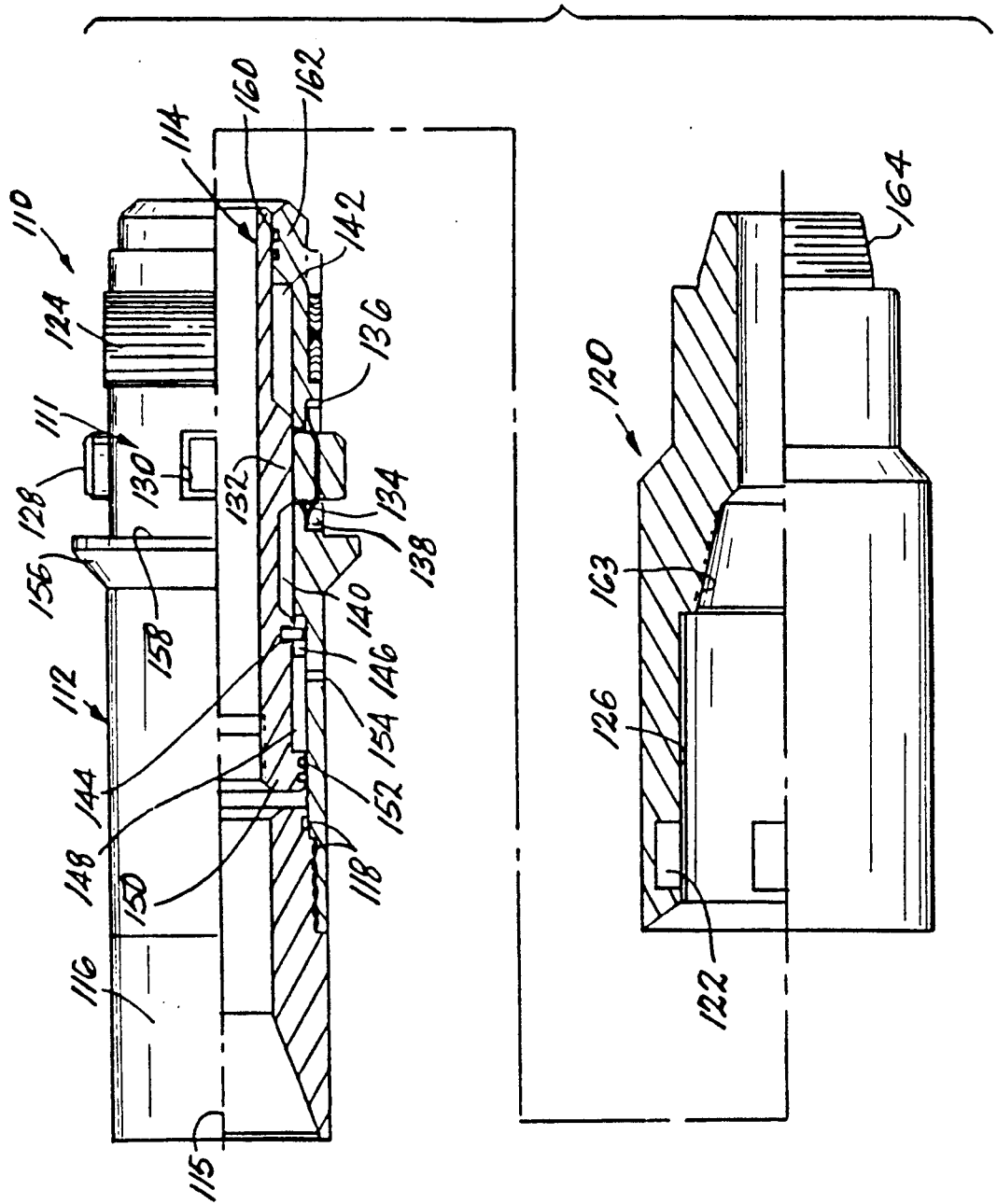
FIG. 2 shows a hydraulic release tool especially suitable as a drill string release, again, partly in half-section.

FIG. 2 shows the present invention adapted as a drill string release tool 110.

The drill string release tool has a shear out setting assembly 111 that has a body 112 and a piston 114 received in the body. These components have a longitudinal axis 115. A sub 116 connects a body 112 by a thread and set screw connection 118 in the manner of the previously described embodiment. A release sub 120 has longitudinal axis 115. It also has four interior sockets 122.

The body has packing 124 on its external surface to engage an interior bore wall 126 of the release sub when the shear out setting assembly and the release sub are engaged.

Four dogs 128 extend through windows 130 in body 112 in response to a land 132 of piston 114 forcing the dogs outwardly against the restoring force of springs 134, one spring for each dog, just like in the previously described embodiment. Also, as in the previously described embodiment, each spring is retained in place by a keeper 136 in keeper recess 138 that is fixed to the wall of the recess. The springs normally bias the dogs radially inward towards the axis of the tool.

At the top and bottom of land 132 are two reliefs 140 and 142. These reliefs function in the manner of the corresponding reliefs of the earlier described tool. Accordingly, top relief 140 moves over the base of dogs 128 upon sufficient hydraulic pressure acting on the piston, and the dogs retract from their extended position in response to the inward directed force of springs 134.

The piston is held in place in the body through a plurality of shear pins 144. As before, the shear pins mount in a ring 146 that is received in a relief 148 defined between the piston and a facing interior wall of body 112. An external flange 150 at the top of the piston mounts O-rings 152. The O-rings seal against the interior wall of body 112 so that relief 148 does not see work string pressure. A relief port 154 maintains the pressure within relief 148 the same as that downhole and outside the tool. When flange 150 passes relief port 154, work string pressure is relieved, signalling the uncoupling of the shear out setting assembly from release sub 120.

As before, the body has an external flange 156 that has a right angle face 158 that engages the end of release sub 120. The trailing end of the flange is conical, as shown, to keep debris out of the connection between the hydraulic release tool and the interior of the running head.

The piston and body of the shear out setting assembly also seal at an interface at their leading ends by O-rings 160 mounted in an internal flange 162 of the body engaging a cooperating surface at the leading end of the piston.

Release sub 120 has an internal thread 163 for a drill pipe connection after the shear out assembly is pulled from the hole. The leading end of the release sub has an external thread 164 also for a drill pipe connection.

Figure 3:
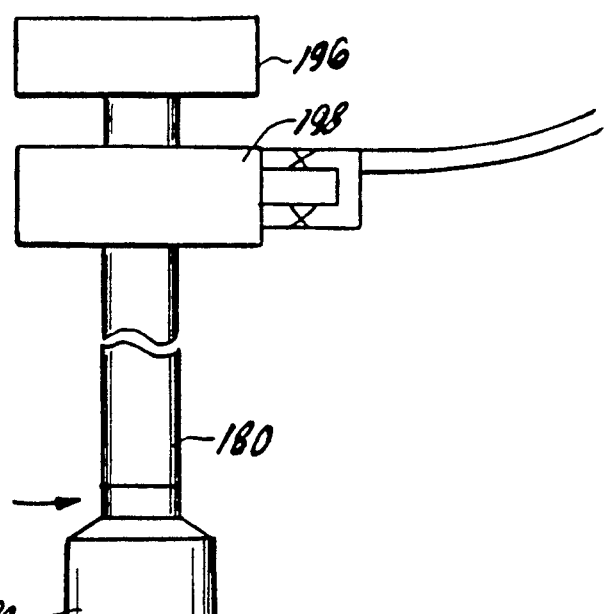
FIG. 3 illustrates schematically the use of the tool of the invention.

With reference to FIG. 3, a typical application of the embodiment of the invention shown in FIG. 1 is illustrated. In FIG. 3, a string of drill pipe 180 connects directly to the hydraulic release tool 10. With reference to FIG. 1, that connection would be through an external thread on the end of the drill pipe and internal thread 40. The hydraulic release tool, in turn, connects serially to other components in the work string. The components shown are a running head 182, a safety joint 184, a liner hanger 186, liner 188, a landing collar 190, a float collar 192, and a float shoe 194. Depending on the application, the safety joint and liner hanger can be eliminated. A top drive or power swivel 196 rotates the work string. A rotating cement head 198 enables cement to enter the drill pipe string.

FIG. 4 shows a pump down wiper dart used in the event that the hydraulic release tool does not function because of an inability to increase work string pressure sufficiently to shear the shear pins. A wiper dart 202 has a head 204 and a plurality of conical rubber wipers 206 after the head. The wipers align the dart in the working string. So much of the dart is conventional. A ball 208 spaced from the balance of the wiper by an axial shaft 209 can seal against seat 33 of the setting assembly shown in FIG. 1.

One application of the liner release tool will now be described with reference to FIGS. 1 and 3. Liner 188 is run into a well hole while rotating drill pipe 180 through top drive or power swivel 196. Rotation of the drill pipe rotates the hydraulic release tool. Because the hydraulic release tool couples to the liner, the liner also rotates. The string moves downhole as it rotates. Rotation reduces the friction that would otherwise exist between the liner and the well hole wall in high angle and extended reach wells. After the liner is properly located in the drill hole, it is time to cement. The liner continues to rotate during cementing under the power of top drive or power swivel.

Cement passes into the interior of the drill pipe string and into the liner to fill them. Then a drill pipe wiper dart is released into the drill pipe. A fluid under pressure behind the drill pipe wiper dart forces the dart through the drill pipe string, wiping the cement from the interior of the drill pipe. When the drill pipe wiper dart reaches the bottom of the drill pipe string and the top of the liner, it latches into a larger diameter wiper plug, and the combination of the two plugs is pumped through the liner to wipe and displace the cement from its interior wall. The liner wiper plug finally bumps into the landing collar and stops.

When the liner wiper plug bumps into the landing collar, pressure in the work string is increased, say to 2,000 psi, to actuate liner hanger 186, which engages the top of the liner with the inside of the previously run casing so that the weight of the liner is taken by the wall where the hanger engages it. Pressure in the work string is then increased, say to 3,200 psi, to shear the shear out setting assembly from the running head. The drill pipe and released shear out setting assembly are then pulled from the hole.

In the event that the wiper plug does not land on the landing collar so that work string pressure increases, pump down dart 202 is inserted in the work string to release the setting assembly from the coupling member. In use and with reference to FIGS. 1 and 4, dart 202 is pumped down the work string. Head 204 and rubber wipers 206 pass through the bore of the piston, and ball plug 208 lands on seat 33, sealing the work string downstream of the seat. With the seal, hydraulic pressure upstream of the ball is not opposed by pressure downstream of the ball on face 32. Further, the area of the piston bore through the ball sees work string pressure, increasing the shearing force on the shear pins. Accordingly, the shear pins shear at a lower pressure, and the piston moves for the retraction of the dogs.

With ball 208 on seat 33, back pressure valves in float collar 192 and float shoe 194 force the ball into a tighter seal on the seat when an attempt is made to pull the setting assembly from the running head. At this time, bleeder slots 35 are radially inside of O-rings 81 because the piston is in its shifted position. Accordingly, the pressure downhole can bleed down through the bleeder slots 35 across the interface between land 28 and the adjacent wall of the body and out windows 56.

The drill string release tool operates much in the same manner as the liner string release tool just described, but it serves a different purpose. The drill string release tool provides a convenient way to separate the drill string in the event that its leading end gets stuck in the well so that the leading end can be removed by standard techniques. The drill string release tool is merely inserted in series in the drill string at a desired point. If the leading end gets stuck, the shear out setting assembly of the drill string release tool is sheared from the release sub, and the drill string and the shear out setting assembly removed so that the stuck portion of the drill string can be retrieved.

The present invention has been described with reference to certain preferred embodiments. The spirit and scope of the appended claims should not, however, necessarily be limited to this description.

We claim:

1. A hydraulic release tool comprising:
   (a) a setting assembly including:
      (i) a body having a longitudinal axis and a longitudinal bore along the axis;
      (ii) a piston translatable in the bore of the body between a setting position and a release position, the piston also having a longitudinal bore and differential areas to effect a net force on the piston in response to hydraulic pressure in the bore of the body that tends to move the piston from the setting position to the release position;
      (iii) a plurality of dogs in the body extendable radially of the axis between a retracted position close to the axis and an extended position further from the axis and outwardly of the body;
      (iv) biasing means for biasing the dogs toward the axis and into the body;
      (v) means on the piston engaging the base of the dogs to extend the dogs outside the body when the piston is in the setting position;
      (vi) means on the piston to disengage the base of the dogs so that the dogs move to their retracted position in response to the dog biasing means when the piston moves into its release position; and
      (vii) means between the piston and the body to hold the piston in the setting position until a predetermined hydraulic pressure exists in the body bore and to release the piston when the hydraulic pressure exceeds the predetermined pressure so that the piston moves to its release position;
   (b) a coupling member for coupling to drill string or petroleum production components, the coupling member having a plurality of sockets for receiving the dogs in their extended position and attaching the coupling member to the setting assembly;
      whereby the setting assembly couples to the coupling member by engagement of the dogs in the sockets and releases from and disengages the coupling member upon movement of the piston from its setting to its release position in response to a pressure in the body in excess of the predetermined pressure; and
   (c) a relief port from outside the body into its bore and means to prevent communication between the relief port and the bore of the body axially of the piston when the piston is in the setting position and to establish such communication upon movement of the piston from the setting position to the release position and reduce the pressure in the body bore axially of the piston, whereby the reduction of the pressure signals that the tool has released the coupling member.

2. The hydraulic release tool of claim 1 wherein the means on the piston for engaging the base of the dogs includes a land on the piston position to abut the base of the dogs in the setting positioned of the piston.

3. The hydraulic release tool of claim 2 wherein the means on the piston to disengage the base of the dogs includes a relief of the piston behind the land that passes under the base of the dogs when the piston moves from its setting position to its release position.

4. The hydraulic release tool of claim 3 wherein the biasing means includes individual springs between the dogs and the body.

5. The hydraulic release tool of claim 4 wherein the holding means includes a plurality of shear pins between the body and the piston that fail at the pressure above the predetermined pressure.

6. The hydraulic release tool of claim 1 wherein:
   (a) the means on the piston for engaging the base of the dogs includes a land on the piston positioned to abut the base of the dogs in the setting position of the piston; and
   (b) the means on the piston to disengage the base of the dogs includes a relief of the piston behind the land that passes under the base of the dogs when the piston moves from its setting position to its release position.

7. The hydraulic release tool of claim 6 wherein the holding means includes a plurality of shear pins attaching the body to the piston that fail at pressure above the predetermined pressure.

8. The hydraulic release tool of claim 7 wherein the biasing means includes individual springs between the dogs and the body and each dog has a chamfered end at its radially outward end to apply a radial force toward the longitudinal axis by engagement of such end with the wall of the socket in the coupling member.

9. The hydraulic release tool of claim 1 wherein the coupling member comprises a running head, the running head having means to attach to a liner to permit the rotation and translation of the liner during liner run in and rotation of the liner during cementing.

10. The hydraulic release tool of claim 1 wherein:
    (a) the means on the piston for engaging the base of the dogs includes a land on the piston positioned to abut the base of the dogs in the setting position of the piston; and
    (b) the means on the piston to disengage the base of the dogs includes a relief of the piston behind the land that passes under the base of the dogs when the piston moves from its setting position to its release position.

11. The hydraulic release tool of claim 10 wherein:
    (a) the biasing means includes individual springs between the dogs and the body; and
    (b) the holding means includes a plurality of shear pins between the body and the piston that fail at the pressure above the predetermined pressure.

12. The hydraulic release tool of claim 1 wherein the coupling member comprises a release sub, the release sub having means to connect it to a drill pipe, whereby the hydraulic release tool placed in a drill string separates the string upon release of the release sub by the setting assembly.

13. The hydraulic release tool of claim 12 wherein:
    (a) the means on the piston for engaging the base of the dogs includes a land on the piston positioned to abut the base of the dogs in the setting position of the piston; and
    (b) the means on the piston to disengage the base of the dogs includes a relief of the piston behind the land that passes under the base of the dogs when the piston moves from its setting position to its release position.

14. The hydraulic release tool of claim 13 wherein:
    (a) the biasing means includes individual springs between the dogs and the body; and
    (b) the holding means includes a plurality of shear pins between the body and the piston that fail at the pressure above the predetermined pressure.

15. A hydraulic release tool comprising:
    (a) a setting assembly including:
        (i) a body having a longitudinal axis and a longitudinal bore along the axis;
        (ii) a piston translatable in the bore of the body between a setting position and a release position, the piston also having a longitudinal bore and differential areas to effect a net force on the piston in response to hydraulic pressure in the bore of the body that tends to move the piston from the setting position to the release position;
        (iii) a plurality of dogs in the body extendable radially of the axis between a retracted position close to the axis and an extended position further from the axis and outwardly of the body;
        (iv) biasing means for biasing the dogs toward the axis and into the body;
        (v) means on the piston engaging the base of the dogs to extend the dogs outside the body when the piston is in the setting position;
        (vi) means on the piston to disengage the base of the dogs so that the dogs move to their retracted position in response to the dog biasing means when the piston moves into its release position; and
        (vii) means between the piston and the body to hold the piston in the setting position until a predetermined hydraulic pressure exists in the body bore and to release the piston when the hydraulic pressure exceeds the predetermined pressure so that the piston moves to its release position;
    (b) a coupling member for coupling to drill string or petroleum production components, the coupling member having a plurality of sockets for receiving the dogs in their extended position and attaching the coupling member to the setting assembly;
    (c) a relief port through the body and into its bore and means to prevent communication between the relief port and the bore of the body axially of the piston, the port being in a position where, on movement of the piston from the setting position to the release position, the relief port reduces the pressure in the body bore axially of the piston, whereby the reduction of the pressure signals that the tool has released the coupling member.

16. A method of running in a liner in a well comprising the steps of:
    (a) in a work string, attaching the liner to the running head of a hydraulic setting and release tool that has a setting assembly of a body having an axial bore, a piston having an axial bore, the piston being in the bore of the body, and a plurality of radially extendable dogs, the piston responding to a predetermined downhole force on he piston produced by hydraulic pressure to move from a setting position to a release position to retract the dogs from engagement with the running head;
    (b) running the liner into position in the well hole by turning it while moving it through the hole by force applied through the tool;
    (c) after the liner is in a desired position in the well hole, releasing the running head from the setting assembly by increasing the pressure in the work string to create the predetermined force to move the piston to the release position, retract the dogs, and disengage the running head; and (d) relieving the increased pressure in the work string through a relief port in the body after disengaging the running head to signal the disengagement of the running head.

17. The method of running in a liner claimed in claim 16 including the step before the releasing step of cementing the liner in the well hole after the liner reaches its desired position while rotating the liner through the tool.

18. The method of running in a liner claimed in claim 16 wherein the step of relieving the increased pressure includes the step of venting the pressure in the work string with movement of the piston to signal release of the running head.

19. The method of running in a liner claimed in claim 16 including in the releasing step landing a sealing dart on the piston to seal the piston's axial bore and increase the net downhole force to create the predetermined force at a lower work string pressure than is necessary without the dart.

20. The method of running in a liner claimed in claim 19 wherein the sealing dart includes a ball mounted on a shaft and the piston has a seat facing uphole, the sealing step including engaging the ball on the piston seat.

21. A release oil tool having a coupling member and a setting assembly, the setting assembly having an attaching means, the tool comprising:
(a) a coupling member for coupling to the setting assembly, the coupling member having means for mating with the attaching means;
(b) a setting assembly including:
   (i) a body having a longitudinal axis and a longitudinal bore substantially along the axis;
   (ii) means for releasably attaching the body to the coupling member's mating means; and
   (iii) means for relieving pressure in the body bore upon the release of the attaching means from the mating means wherein said means for relieving includes a relief port from the body bore to the outside of the body.

22. The tool of claim 21 wherein the means for attaching includes a piston translatable longitudinally in the body bore from an attachment position to a detachment position, the piston being in the attachment position when the body is attached to the coupling member.

23. The tool of claim 22 wherein the piston has a substantially longitudinal bore in communication with the body bore.

24. The tool of claim 21 wherein the attaching means is movable from the attachment position to the detachment position in response to a change in hydraulic pressure in the body bore.

25. A method of hydraulically releasing a coupling member from a setting assembly in a well comprising:
(a) in a work string, attaching a coupling member to a setting assembly that has a means for releasably attaching the setting assembly to the coupling member and for releasing the coupling member in response to an increase in hydraulic pressure;
(b) running the setting assembly down a well;
(c) increasing the hydraulic pressure in the work string to release the attachment between the coupling member and the setting assembly; and (d) relieving the increase in hydraulic pressure in the work string through a relief port to signal the release of the coupling member.

26. The method of claim 25 wherein the step of relieving the increase in hydraulic pressure includes driving a piston within the body bore in response to the pressure increase to uncover a relief port opening in the body bore.

27. A method of running in a liner in a well comprising:
(a) in a work string, attaching the liner to the running head of a setting and release tool that has a body having an axial bore and means for releasably attaching the liner to the running head, the means releasing the liner in response to an increase in hydraulic pressure;
(b) running the liner into position in the well;
(c) after the liner is in a desired position in the well, releasing the running head from the setting assembly by increasing the hydraulic pressure in the work string; and
(d) relieving the increase in hydraulic pressure in the work string through a relief port after releasing the liner to signal the release of the liner.

28. The method of claim 27 wherein the step of relieving the increase in hydraulic pressure includes driving a piston within the body bore in response to the pressure increase to uncover a relief port opening in the body bore.

29. A hydraulic release tool having a coupling member and a setting assembly, the setting assembly having an attaching means, the tool comprising:
(a) a coupling member for coupling to the setting assembly, the coupling member having means for mating with the attaching means: and
(b) a setting assembly including:
   (i) a body having a longitudinal axis and a longitudinal bore along the axis;
   (ii) means for attaching the body to the coupling member's mating means, the attaching means being movable from an attachment position to a detachment position, the attaching means engaging the coupling assembly mating means to attach the coupling and setting assemblies in the attachment position:
   (iii) means for allowing the attaching means to move from the attachment position to the detachment position in response to changes in hydraulic pressure in the body bore; and
   (iv) ported means for relieving pressure in the body bore to outside the body upon release of the attaching means.

30. The tool of claim 29 wherein the allowing means allows the attaching means to move from the attachment position in response to an increase in hydraulic pressure in the body bore.

31. The tool of claim 29 wherein the attaching means includes a plurality of dogs extendable radially of the body axis.

32. The tool of claim 31 wherein the mating means includes a plurality of sockets for receiving the dogs when the dogs are radially extended to the attachment position.

33. The tool of claim 32 wherein the sockets include side walls engageable by the dogs for transmitting motion rotational about the longitudinal axis from the setting assembly to the coupling assembly.

34. The tool of claim 29 wherein the mating means includes means for transmitting motion, rotational about the longitudinal axis from the setting assembly to the coupling assembly.

35. The tool of claim 29 wherein the allowing means includes a piston translatable along the longitudinal axis in the body bore between a setting position and a release position, the piston having a first surface for engaging the attaching means and urging the attaching means to the attachment position when the piston is in the setting position and a second surface not engaging the attaching means when the piston is in the release position.

36. The tool of claim 35 including means for holding the piston in the setting position until a predetermined hydraulic pressure exists in the body bore and for releasing the piston when the hydraulic pressure exceeds the predetermined pressure.

37. The tool of claim 36 wherein the holding means includes a plurality of shear pins between the body and the piston that fail when the hydraulic pressure exceeds the predetermined pressure.

38. The tool of claim 35 wherein the piston includes a landing seat for receiving and sealing against a dart so that when a landing dart is received the hydraulic pressure in the body bore is increased.

39. The tool of claim 29 including a landing seat in the body bore for receiving and sealing against a dart, the landing seat being positioned so that when a landing dart is received, the hydraulic pressure in the body bore is increased.

40. The tool of claim 29 including means for biasing the attaching means toward the detachment position.

41. The tool of claim 40 wherein the biasing means includes a spring.

42. The tool of claim 29 wherein the coupling member comprises a running head, the running head having means to attach to a liner to permit the rotation and translation of the liner during liner run in and rotation of the liner during cementing.

43. The tool of claim 29 wherein the coupling member comprises a release sub, the release sub having means to connect it to a drill pipe, whereby the hydraulic release tool placed in a drill string separates the string upon release of the release sub by the setting assembly.

44. A hydraulic release tool having a coupling member and a setting assembly, the setting assembly having an attaching means, the tool comprising:
(a) a coupling member for coupling to the setting assembly, the coupling member having means for mating with the attaching means: and
(b) a setting assembly including:
(i) a body having a longitudinal axis and a longitudinal bore along the axis;
(ii) means for attaching the body to the coupling member's mating means, the attaching means being movable from an attachment position to a detachment position, the attaching means engaging the coupling assembly mating means to attach the coupling and setting assemblies in the attachment position:
(iii) means for allowing the attaching means to move from the attachment position to the detachment position in response to changes in hydraulic pressure in the body bore wherein the allowing means includes an upper face in the body bore directed away from the coupling member and a smaller bottom face in the body bore directed toward the coupling member.

45. A hydraulic release tool having a coupling member and a setting assembly, the setting assembly having an attaching means, the tool comprising:
(a) a coupling member for coupling to the setting assembly, the coupling member having means for mating with the attaching means: and
(b) a setting assembly including:
(i) a body having a longitudinal axis and a longitudinal bore along the axis;
(ii) means for attaching the body to the coupling member's mating means, the attaching means being movable from an attachment position to a detachment position, the attaching means engaging the coupling assembly mating means to attach the coupling and setting assemblies in the attachment position:
(iii) means for allowing the attaching means to move from the attachment position to the detachment position in response to changes in hydraulic pressure in the body bore, wherein the allowing means includes a piston translatable along the longitudinal axis in the body bore between a setting position and a release position, the piston having a first surface for engaging the the attachment means and urging the attaching means to the attachment position when the piston is in the setting position and a second surface not engaging the attaching means when the piston is in the release position and wherein the piston includes a bottom face in the body bore for urging the first surface into engagement with the attaching means in response to hydraulic pressure in the body bore and an upper face in the body bore for urging the first surface away from engagement with the attaching means in response to hydraulic pressure in the body bore.

46. The tool of claim 45 wherein the upper face has a greater surface area than the bottom face.

47. A hydraulic release tool having a coupling member and a setting assembly, the setting assembly having an attaching means, the tool comprising:
(a) a coupling member for coupling to the setting assembly, the coupling member having means for mating with the attaching means: and
(b) a setting assembly including:
(i) a body having a longitudinal axis and a longitudinal bore along the axis;
(ii) means for attaching the body to the coupling member's mating means, the attaching means being movable from an attachment position to a detachment position, the attaching means engaging the coupling assembly mating means to attach the coupling and setting assemblies in the attachment position:
(iii) means for allowing the attaching means to move from the attachment position to the detachment position in response to changes in hydraulic pressure in the body bore, wherein the allowing means includes a piston translatable along the longitudinal axis in the body bore between a setting position and a release position, the piston having a first surface for engaging the the attaching means and urging the attaching means to the attachment position when the piston is in he setting position and a second surface not engaging the attaching means when the piston is in the release position and wherein said allowing means includes a hydraulic pressure relief port from outside the body into the body bore and means for preventing fluid communication between the relief port and the body bore when the piston is in the release position.

48. The tool of claim 47 wherein the means for preventing and allowing fluid communication includes a flange on the piston for preventing and allowing fluid flow between the piston and the body bore to the relief port in response to the position of the piston.

49. A hydraulic release tool comprising:
(a) a setting assembly including:
 (i) a body having a longitudinal axis and a longitudinal bore substantially along the axis;
 (ii) a piston translatable in the body bore in response to changes in hydraulic pressure therein between a setting position and a release position, the piston having a substantially longitudinal bore and faces with differential areas to effect a net force on the piston in response to hydraulic pressure in the body bore that urges the piston from the setting position to the release position;
 (iii) a plurality of dogs in the body extendable radially of the axis between a retracted position close to the axis and an extended position further from the axis and outwardly of the body;
 (iv) a first piston surface engaging the dogs for urging the dogs to their extended position when the piston is in the setting position;
 (v) a second piston surface for allowing the dogs to move to their retracted position when the piston is in its release position;
 (vi) means between the piston and the body for holding the piston in the setting position until a predetermined hydraulic pressure exists in the body bore; and
 (vii) relief port means for relieving pressure in the body bore to outside the body upon the release of the holding means; and
(b) a coupling member for coupling the setting assembly to a drill string, the coupling member having a plurality of sockets for receiving the dogs when in their extended position.

50. The tool of claim 49 including means for biasing the dogs toward the axis and into the body.

51. The hydraulic release tool of claim 50 wherein the biasing means includes individual springs between the dogs and the body.

52. The hydraulic release tool of claim 50 wherein each dog has a chamfered end at its radially outward end to apply a radial force toward the longitudinal axis by engagement of such end with the wall of the socket in the coupling member.

53. The hydraulic release tool of claim 49 wherein the first piston surface includes a land on the piston positioned to abut the dogs in the setting position of the piston.

54. The hydraulic release tool of claim 53 wherein the second piston surface includes a relief behind the land that passes under the dogs when the piston moves from its setting position to its release position.

55. The hydraulic release tool of claim 49 wherein the holding means includes a plurality of shear pins between the body and the piston that fail when the hydraulic pressure exceeds the predetermined pressure.

56. A method of running in a pipe in a well comprising the steps of:

(a) attaching the pipe to a running head of a tool having a substantially axial bore, a relief port, and means for responding to hydraulic pressure;
(b) running the pipe into position in the well moving it through the hole by force applied through the tool;
(c) after the pipe is in a position in the well, releasing the running head by increasing the hydraulic pressure in the pipe; and
(d) relieving said increased hydraulic pressure to outside said bore through said relief port.

57. A hydraulic release tool comprising:
(a) a setting assembly including:
 (i) a body having a longitudinal axis and a substantially longitudinal bore about the axis;
 (ii) a plurality of dogs in the body extendable radially of the axis between an attachment position and a detachment position;
 (iii) means for allowing the dogs to move from the attachment position to the detachment position including a piston translatable along the longitudinal axis wherein an upper face of said piston has a greater surface area than a bottom face; and
(b) a coupling member for coupling the setting assembly to a drill string, the coupling member having a plurality of sockets for receiving the dogs when the dogs are in their attachment position.

58. The tool of claim 57 wherein the allowing means responds to hydraulic pressure in the body bore.

59. The tool of claim 58 wherein the allowing means allows the dogs to move from the attachment position to the detachment position upon an increase in the hydraulic pressure in the body bore.

60. The tool of claim 59 including means for preventing the allowing means from allowing the dogs to move to the detachment position until the hydraulic pressure in the body bore exceeds a predetermined pressure.

61. The tool of claim 59 wherein the upper face has a greater surface area than the bottom face.

62. The tool of claim 58 including a landing seat in the body bore for receiving and sealing against a dart, the landing seat being positioned so that when a landing dart is received, the hydraulic pressure in the body bore is increased.

63. The tool of claim 58 including a hydraulic pressure relief port from outside the body into the body bore and means for preventing fluid communication between the relief port and the body bore when the piston is in the setting position and allowing fluid communication between the relief port and the body bore when the piston is in the release position.

64. The tool of claim 63 wherein the means for preventing and allowing fluid communication includes a flange on the piston for preventing and allowing fluid flow between the piston and the body bore to the relief port in response to the position of the piston.

65. The tool of claim 57 including means for biasing the dogs toward the detachment position.

66. The tool of claim 65 wherein the biasing means includes a spring.

67. The tool of claim 57 wherein the coupling member comprises a running head, the running head having means to attach to a liner to permit the rotation and translation of the liner during liner run in and rotation of the liner during cementing.

68. The tool of claim 57 wherein the coupling member comprises a release sub, the release sub having means to connect it to a drill pipe, whereby the hydraulic release tool placed in a drill string separates the string upon release of the release sub by the setting assembly.

69. A method of releasing a coupling member from a setting assembly in a well comprising:
(a) in a work string, attaching a coupling member to a setting assembly that has a body with a bore substantially along its longitudinal axis, a plurality of extendable dogs for engaging the coupling member, the dogs being retractable to release the coupling member, and a piston translatable in the bore to alternately extend and allow retraction of the dogs;
(b) running the coupling member into position in the well by force applied through the tool; and
(c) applying hydraulic pressure in substantially equal amounts to larger and smaller oppositely directed end faces of the piston in an amount sufficient to translate the piston in the direction of the smaller end face and allow retraction of the dogs.

* * * * *